United States Patent [19]

Nagai

[11] Patent Number: 4,601,272
[45] Date of Patent: Jul. 22, 1986

[54] IGNITION TIMING CONTROL SYSTEM FOR AN AUTOMOTIVE ENGINE

[75] Inventor: Masaaki Nagai, Hachiouji, Japan

[73] Assignee: Fuji Jukogyo Kabushiki Kaisha, Tokyo, Japan

[21] Appl. No.: 764,897

[22] Filed: Aug. 12, 1985

[30] Foreign Application Priority Data

Aug. 16, 1984 [JP] Japan .............................. 59-171268

[51] Int. Cl.⁴ ............................................ F02D 41/26
[52] U.S. Cl. ................................... 123/425; 123/417; 123/418; 123/422
[58] Field of Search ............... 123/425, 417, 418, 422, 123/480

[56] References Cited

U.S. PATENT DOCUMENTS

| 4,450,810 | 5/1984 | Wada et al. | 123/425 |
| 4,452,206 | 6/1984 | Haraguchi et al. | 123/425 |
| 4,466,405 | 8/1984 | Hattori et al. | 123/425 |
| 4,471,736 | 9/1984 | Yoshida et al. | 123/425 |
| 4,489,692 | 12/1984 | Haraguchi et al. | 123/425 |
| 4,508,075 | 4/1985 | Takao et al. | 123/417 |
| 4,508,079 | 4/1985 | Komurasaki et al. | 123/425 |
| 4,510,910 | 4/1985 | Ninomiya et al. | 123/417 |
| 4,527,526 | 7/1985 | Akasu | 123/425 |
| 4,547,852 | 10/1985 | Kamifuji et al. | 123/417 |

Primary Examiner—Raymond A. Nelli
Attorney, Agent, or Firm—Martin A. Farber

[57] ABSTRACT

A control system has a circuit for deciding ignition timing in accordance with driving condition of a motor vehicle, a sensor for detecting the magnitude of the acceleration of an engine, and a knock sensor for detecting knock of the engine. When the knock is detected, the ignition timing decided by the circuit is corrected in accordance with the magnitude of the knock, with the magnitude of the acceleration, and with the driving condition.

2 Claims, 7 Drawing Figures

IGNITION TIMING CONTROL SYSTEM FOR AN AUTOMOTIVE ENGINE

BACKGROUND OF THE INVENTION

The present invention relates to a system for controlling the ignition timing of an automotive engine so as to prevent the knock of the engine.

Various ignition timing control system for preventing the knock of the automotive engine are known. However, a system which can prevent or suppress the knock at rapid acceleration or racing of the engine at high speeds has not been proposed.

SUMMARY OF THE INVENTION

The object of the present invention is to provide a system for an automotive engine which may control the engine knock sound, which occurs at rapid acceleration and high speed racing of the engine, to lower levels than a predetermined value.

According to the present invention, there is provided an ignition timing control system for an automotive engine, comprising means for detecting driving conditions of a motor vehicle driven by the engine and for producing a driving condition signal, first circuit means responsive to the driving condition signal for deciding ignition timing, detecting means for detecting the magnitude of the acceleration of the engine and for producing an acceleration signal, knock detecting means for detecting knock of the engine and for producing a knock signal the level of which is dependent on the magnitude of the knock. The system has second circuit means responsive to the knock signal for producing an advance/retard signal, correcting circuit means for correcting the advance/retard signal, a plurality of first areas in a memory for storing advance/retard correcting values. First selecting circuit means is provided for designating one of the first areas in accordance with the driving condition signal and acceleration signal and for storing an advance/retard signal corrected by the correcting circuit means. Further, second selecting means is provided for deriving the corrected advance/retard signal from a designated area in the first areas and for sending it to the correcting circuit means so as to correct the advance/retard signal.

The other objects and features of this invention will be apparently understood from the following description with reference to the accompanying drawings.

DETAILED DESCRIPTION OF THE PREFERRED EMBODIMENT

Figure 1A:
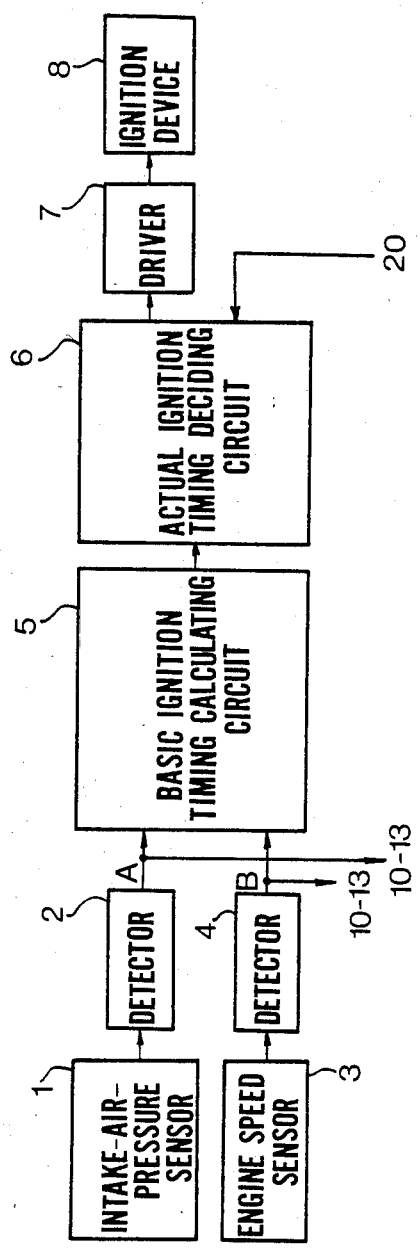
FIG. 1a and 1b are block diagrams showing a control system according to the present invention.
Figure 1B:
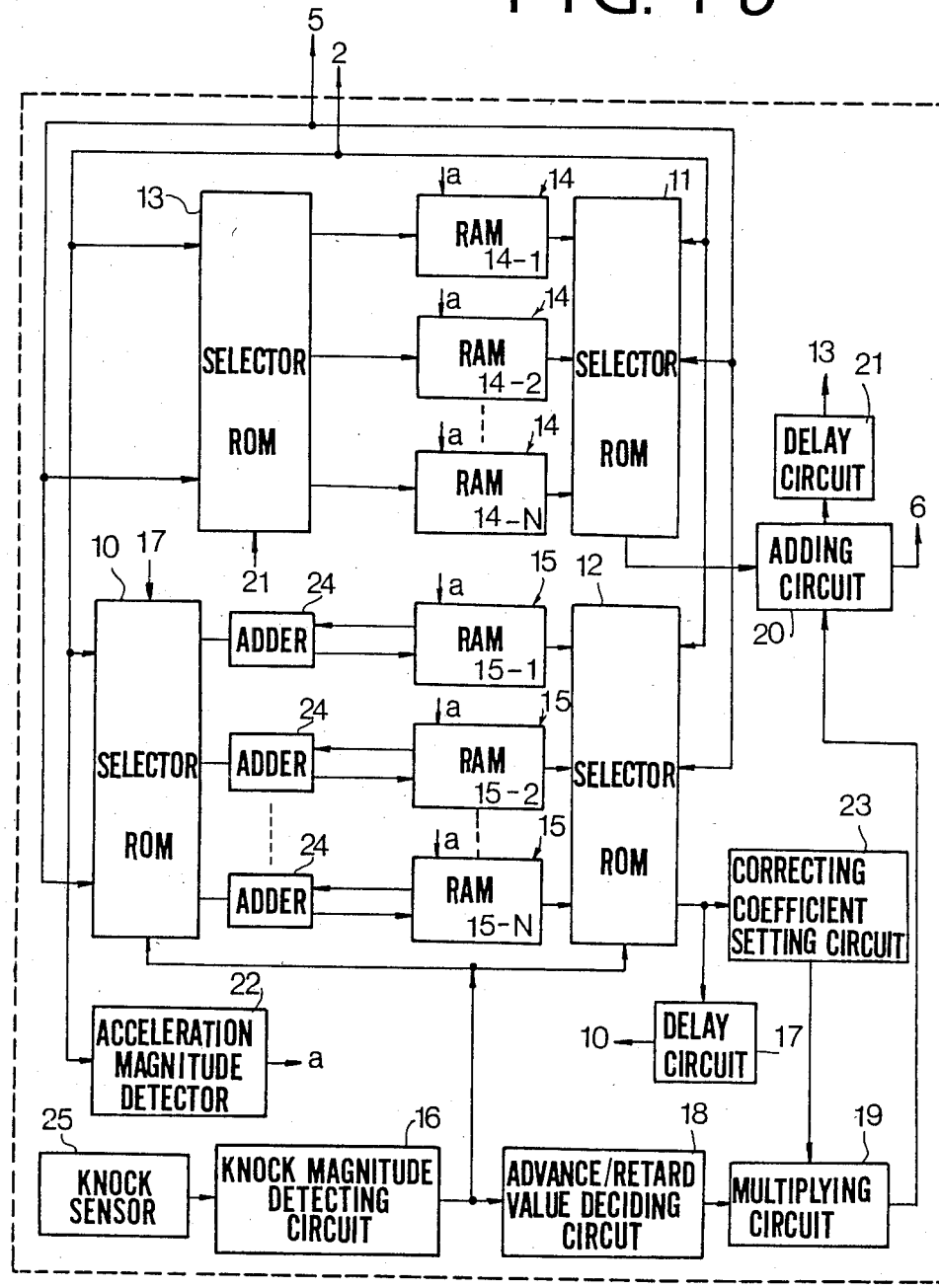

Referring to FIG. 1, the system of the present invention is provided with a sensor 1 for sensing the pressure of intake air of an automotive engine, which represents engine load, and an engine speed sensor 3 for producing pulses the repetition frequency of which is proportional to the engine speed. Outputs of the sensors 1 and 3 are applied to detectors 2 and 4 including encorders. Detectors 2 and 4 produce an engine load signal A and an engine speed signal B, at predetermined intervals in synchronism with engine speed, respectively. The engine load signal and engine speed signal are applied to a basic ignition timing calculating circuit 5 including a ROM. The output of the circuit 5 is applied to an actual ignition timing deciding circuit 6, the output of which is applied to an ignition device 8 through a driver 7 to ignite air-fuel mixture.

Figure 2:
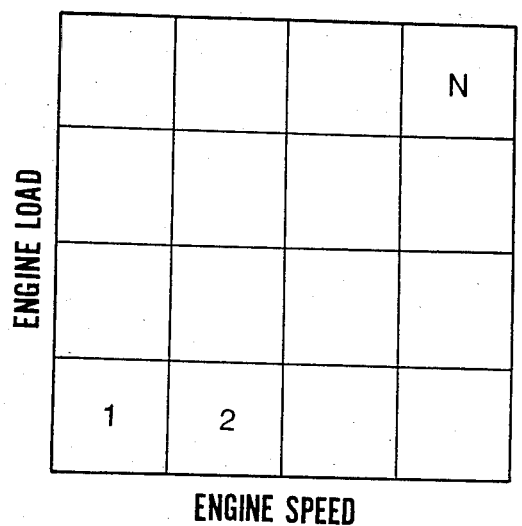
FIG. 2 is a matrix showing addresses of RAMs for engine operating conditions.

The engine load signal A and engine speed signal B, which are outputs of detectors 2, 4, are also applied to a control unit C for initiating the operations of various components thereof. The control unit has selectors 10, 11, 12 and 13 each comprising a ROM. Each selector has a matrix of addresses as shown in FIG. 2. One of the addresses (1,2--- N) is selected by the engine load and engine speed signals A and B. The system further comprises a RAM having a plurality of RAM areas 14-1 . . . 14-N for storing advance/retard correcting values and RAM areas 15-1 . . . 15-N for storing the number of times of the correction. Each group of areas corresponds to the addresses 1---N and one of the areas is designated by the output of the corresponding selector in accordance with engine operating condition. Further, each area comprises a plurality of subdivided small areas which are designated by the magnitude of acceleration of the engine as described hereinafter. The signal A is further applied to an acceleration magnitude detector 22 which produces an output a which is proportional to the magnitude of the acceleration of the engine and designates one of the small areas in areas 14 and 15 in accordance with the magnitude. The magnitude of acceleration is decided, for example, by the rate of pressure change of intake air per unit time.

At the first operation of the engine mounted on a motor vehicle after the manufacturing of the vehicle, no values are stored in areas 14 and areas 15, and no correcting signal is applied to the actual ignition timing deciding circuit 6. Accordingly, at the first operation, ignition timing calculated at the circuit 5 is used as an actual ignition timing for driving the ignition device 8.

Figure 3:
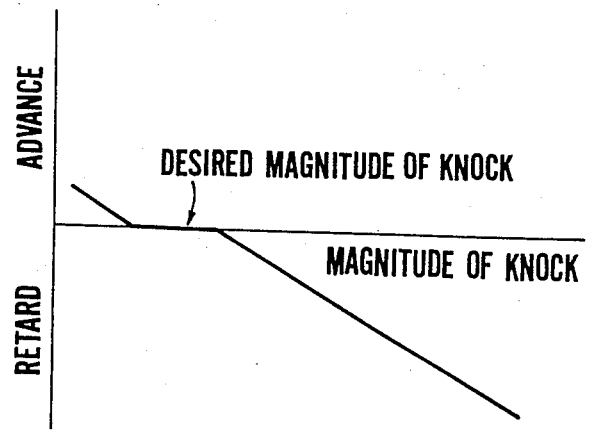
FIG. 3 is a graph showing the relationship between the magnitude of engine knock and ignition timing.

The system is provided with a knock sensor 25. The sensor 25 produces an output the level of which is dependent on the magnitude of the knock. The magnitude includes zero, when knock does not occur. The magnitude is detected by a knock magnitude detecting circuit 16, the output of which is applied to an advance/retard value deciding circuit 18 comprising a ROM which stores advance/retard values, for example as shown in FIG. 3. Accordingly, the circuit 18 produces an advance or retard signal dependent on the magnitude of the knock. The signal is applied to the circuit 6 through a multiplying circuit 19 and an adding circuit 20.

Figure 4:
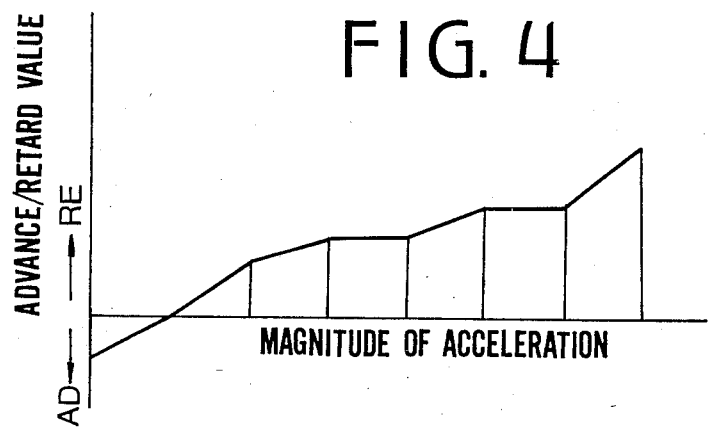
FIG. 4 is a graph showing the relationship between the magnitude of acceleration of an engine and advance/retard value.

Further, the output of the adding circuit 20, which represents an advance/retard value, is applied to selector 13 with a delay by a delay circuit 21. The selector 13 designates one of areas 14-1 to 14-N in accordance engine operating condition, and one of small areas of designated area is designated by the signal a in accordance with the acceleration magnitude, so that the output of the adding circuit 20 is stored in the designated small area. FIG. 4 shows stored advance/retard value, for example in eight small areas of one of areas 14. Each value is updated as the number of times of correction increases as will be understood from the following description.

Figure 5:
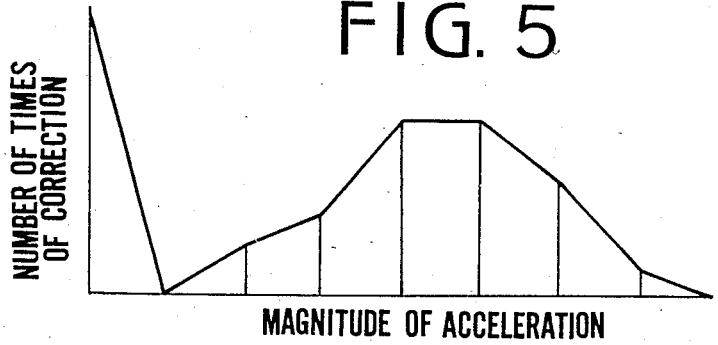
FIG. 5 is a graph showing the relationship between the magnitude of the acceleration and the number of times of correction.
Figure 6:
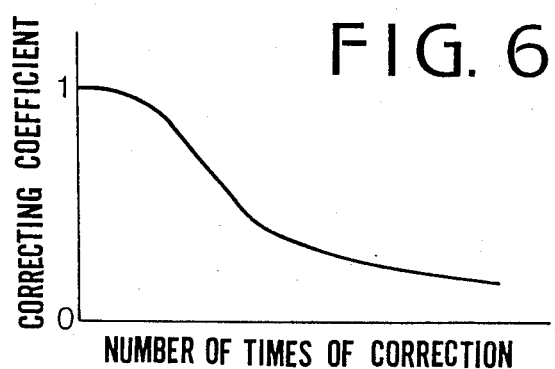
FIG. 6 is a graph showing the relationship between the number of times of the correction and correcting coefficient.

On the other hand, the output of the knock magnitude detecting circuit 16 is applied to the selector 10 which designates one of areas 15 in accordance with engine operating condition and latches the address of the RAM. The output of the knock magnitude detecting circuit 16 is also applied to the selector 12. As shown in FIG. 5, the number of times of ignition time correction is registered in small areas of RAM area 15 in accordance with the magnitude of acceleration which includes magnitude zero. The stored number in the small area of area 15 is read out by the designation of the selector 12 in accordance with engine operating condition and acceleration magnitude and applied to a correcting coefficient setting circuit 23. The circuit 23 has data as shown in FIG. 6, which are updated by learning operation. The circuit 23 produces a correcting coefficient dependent on the number of correction, which is applied to the multiplying circuit 19.

In operation at the first time, the knock magnitude detecting circuit 16 produces an output proportional to the magnitude of the knock fed from the knock sensor 25. The output is applied to advance/retard value deciding circuit 18, selectors 10 and 12. The selector 10 latches the address of one of areas 15 in accordance with driving condition of the motor vehicle, which is decided by signals A and B, in response to the output of the circuit 16. Further, one of small areas in the designated area is designated by the signal a from acceleration magnitude detector 22. The selector 12 produces a zero signal, since the number of times of correction in the designated small area is zero. The circuit 18 produces an advance or retard signal which is applied to the actual ignition timing deciding circuit 6 through circuits 19 and 20 without modification at the circuits. The circuit 6 corrects the ignition timing fed from circuit 5. Thus, the ignition device 8 operates at a proper timing to ignite the air-fuel mixture.

On the other hand, the output of the adding circuit 20 is applied to selector 13 with a delay decided by delay circuit 21. The selector 13 and signal a from the acceleration magnitude detector 22 designate one of small areas in areas 14 in accordance with the driving condition and the designated small area stores the signal from circuit 20 which represents advance/retard correcting value. Further, selector 12 produces a signal in response to the output of the circuit 16, which is applied to selector 10 with a delay decided by a delay circuit 17. The selector 10 sends a signal representing the number of times of correction to an adder 24 corresponding to the designated address. The output of the adder is stored in the designated small area of areas 15.

After the first cycle of the operation, at every operation cycle, the selector 12 operates to derive a signal from one of small areas in areas 15 in accordance with the driving condition and the magnitude of acceleration and sends a signal to the correcting coefficient setting circuit 23. The circuit 23 produces the correcting coefficient which is applied to the multiplying circuit 19. Accordingly, the output of the advance/retard value deciding circuit 18 is multiplied by the correcting coefficient. Further, selector 11 derives a correcting value from one of small areas in areas 14 and sends it to the adding circuit 20, which is added to the output of circuit 19. Thus, the output of the circuit 18 is corrected at circuits 19 and 20 and applied to the circuit 6, whereby ignition timing at the occurrence of engine knock at rapid acceleration of the engine can be properly corrected.

While the presently referred embodiment of the present invention has been shown and described, it is to be understood that this disclosure is for the purpose of illustration and that various changes and modifications may be made without departing from the scope of the invention as set forth in the appended claims.

What is claimed is:

1. An ignition timing control system for an automotive engine, comprising:
   means for detecting driving conditions of a motor vehicle driven by the engine and for producing a driving condition signal;
   first circuit means responsive to the driving condition signal for deciding ignition timing;
   detecting means for detecting the magnitude of the acceleration of the engine and for producing an acceleration signal;
   knock detecting means for detecting knock of the engine and for producing a knock signal the level of which is dependent on the magnitude of the knock;
   second circuit means responsive to the knock signal for producing an advance/retard signal;
   correcting circuit means for correcting the advance/retard signal;
   a plurality of first areas in a memory for storing advance/retard correcting values;
   first selecting circuit means for designating one of the first areas in the memory in accordance with the driving condition signal and the acceleration signal and for storing an advance/retard signal corrected by the correcting circuit means;
   second selecting means for deriving the corrected advance/retard signal from a designated area in the first areas and for sending it to the correcting circuit means so as to correct the advance/retard signal.

2. The control system according to claim 1 further comprising a plurality of second areas in a memory for storing the number of times of the correction, third selecting circuit means for designating one of the second areas in accordance with the driving condition signal and the acceleration signal and responsive to the knock signal for storing the number in the designated area, and fourth selecting means for deriving the number stored in the second area in accordance with the driving condition signal and the acceleration signal and third circuit means responsive to the derived number by the fourth selecting circuit means for producing a correcting coefficient and for sending the coefficient to the correcting circuit means so as to correct the advance/retard signal.

* * * * *